(No Model.)
C. W. S. TURNER.
PNEUMATIC TUBING.
No. 522,278. Patented July 3, 1894.
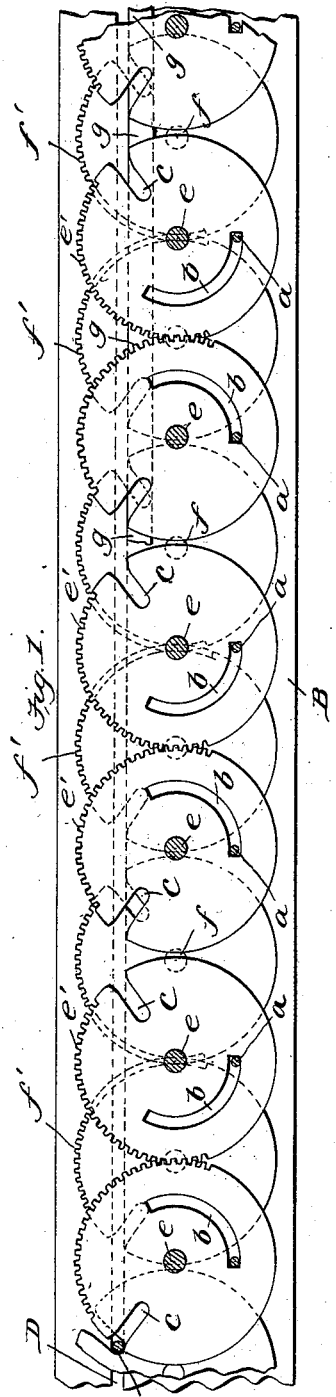
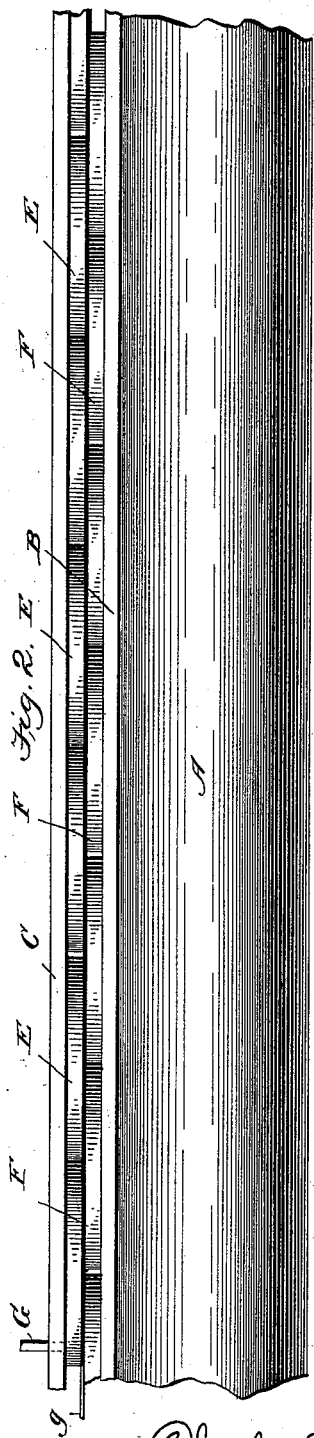
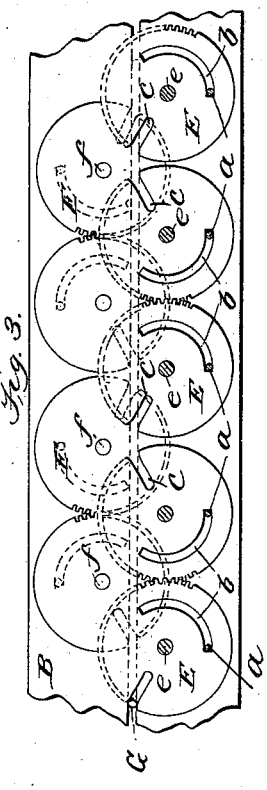
Witnesses
Edwin L. Bradford
Sam'l W. Jacobson
Charles W. S. Turner, Inventor
by Lewis Abraham, Attorney
THE NORRIS PETERS CO., PHOTO-LITHO., WASHINGTON, D. C.

UNITED STATES PATENT OFFICE.

CHARLES W. S. TURNER, OF MIDDLEBURG, VIRGINIA.

PNEUMATIC TUBING.

SPECIFICATION forming part of Letters Patent No. 522,278, dated July 3, 1894.

Application filed March 17, 1894. Serial No. 504,008. (No model.)

*To all whom it may concern:*

Be it known that I, CHARLES W. S. TURNER, a citizen of the United States, residing at Middleburg, in the county of Loudoun and State of Virginia, have invented certain new and useful Improvements in Pneumatic Tubing; and I do hereby declare the following to be a full, clear, and exact description of the invention, such as will enable others skilled in the art to which it appertains to make and use the same.

My invention relates to pneumatic transit devices, and consists of novel and useful means for opening and closing the slot of the tube employed for the air main, whereby the admission and exclusion of air are controlled as motion is imparted to vehicles for transporting them to stations of the route.

My invention is hereinafter fully explained, illustrated in the drawings, and specifically pointed out in the claims.

Referring to the accompanying drawings, wherein like letters of reference point out similar parts on each figure,—Figure 1. is an interior view of the case, the outer plate removed, with inclosed disk valves, adjusted according to my invention. Fig. 2. represents a pneumatic tube with case containing rotatable disk valves according to my invention. Fig. 3. is an interior view of the device, the disk valves being pivotally connected to opposite plates on parallel lines, the covering plate being removed.

In the drawings, A, represents a tube of ordinary construction, such as generally employed for passage therethrough of the air current of a pneumatic route, provided with a continuous slot, D, through which extends outwardly a plunger arm, its lower end being connected to a plunger, not shown in the drawings, and at its upper end adjusted to a car or other vehicle to be transported along the route. This plunger arm is illustrated in the drawings as a vertical arm G, no special form thereof being herein claimed.

In carrying out my invention, I provide an incasement consisting of inner and outer plates, B, C, which with inclosures presently described, is permanently connected in any suitable manner over the tube, A. I have illustrated in Fig. 2, an incasement above the tube, with lengthwise opening in alignment with slot, D, but do not desire to be understood as limiting it to such location; when the tube is employed for a vertical route as for instance in an elevator, the incasement and its inclosures will extend at one side of the slot in alignment therewith; again, if the tube is used for an over-head transit route the slot of the tube will be in reversed position, to that shown in Fig. 2, and the incasement plates with their inclosures will be adjusted directly below the tube.

In the construction shown in Figs. 1 and 2, the outer plate, C, is supplied with a series of circular disks, E, having teeth gear, $e'$, extending outwardly from the periphery thereof. The whole periphery of the respective disks is not supplied with teeth gear, a portion being left smooth, as plainly illustrated; said disks are each pivoted to an axial pin, $e$, extending from the incasement plates, B, C, enabling each to rotate independently when motion is imparted thereto. Each of said disks has a slot, $c$, extending a given distance in a right line from its periphery inwardly. Said disks have on one surface a curved groove, $b$, into which is seated one end of a pin, $a$, fastened to and extending from plate, C, whereby rotary motion of said disks is limited by the length of said groove and toothed gear, as will be readily understood. To the inner plate, B, disks of similar construction are adjusted in like manner, the series connected to said inner plate being indicated in drawings, as follows: F, disks; $f'$, peripheral teeth; $f$, pivot pintle. In all the disks the teeth, as before set forth, extend but a predetermined distance of the periphery thereof, whereby when the disks are pivoted to the respective plates, B, C, a tooth gear is composed, which, when brought into engagement and motion is imparted thereto, will rotate juxtaposing pairs of disks through the segment of a circle limited by groove, $b$, and the length of the peripheral tooth gear. The pintles, $e$, $f$, upon which the series of disks are pivoted to the respective plates, B, C, extend in a right line along said plates, at a distance to allow the several disks to freely turn in pairs, but the pivots of the several disks equally equidistant apart, are so located that they will be intermediate of each other when the two plates are adjusted, as shown in Fig. 2, and the superimposed disks will thereby revolve in alternate circles.

Intermediate of the overlying disks is a lengthwise thin metal strip, g, shown in Fig. 1, a partial length thereof, in dotted lines, also in Fig. 2, extending outwardly from one end. The inner side edge of said strip reaches to the juxtaposing line of the tube slot, its purpose being to close the openings, c, of the disks where crossing each other and prevent passage inwardly or outwardly, of air, or leakage of water. By this adjustment no opening of the slot will occur until the arm, G, or analogous mechanism is brought in contact with slot, c, of each disk.

Instead of adjusting the disks directly over each other so that the upper and lower ones will rotate in uniform circles, they may be journaled on lines a distance apart on plates, as shown in Fig. 3, whereby a portion of each opposite disk will overlie the slot, D, it being understood that in this arrangement as well as in the arrangement illustrated in Figs. 1, and 2, the series of disks rotate on planes a slight distance apart, the intermediate strip, g, closing the engaging slots, c, as previously set forth.

From the foregoing description, in connection with the drawings, the nature and object of my invention, and its practical operation will be readily understood by all familiar with devices of analogous character.

Its operation may be thus briefly described:—The plunger arm connected to plunger within the tube and at its upper end to vehicle, passes through slot, D, and when projected along the route will enter slot, c, of the adjacent disk which will thereby be turned on its pivot and by means of the peripheral toothed gear will turn the next adjacent disk through the segment of a circle the length of said gear, and of the groove at the lower surface of each disk having the limiting pin extending therein. As each disk rotates there will be presented a slot, c, on the following disk, and so on in succession all along the route, thus opening a pathway for transit of arm, G, or similar device and immediately closing the slot as progression is made; at the same time by counter action of the disks by means of the engaging toothed gear each pair of disks will be reversely rotated, and the slot will be hermetically closed by the overlying sections of the several disks.

I deem my invention a valuable improvement over slot closing valves controlled by spring action or vertically movable plugs.

Having now fully described my invention and the manner of its operation, what I claim, and desire to secure by Letters Patent of the United States of America, is—

1. In a longitudinally slotted tube transit system, a series of overlying rotatable disks, pivotally connected to inner and outer plates of an incasement, said disks having teeth gear extending a required distance of their peripheries, and each having upon its surface next to plates of the incasement a curved grooved, b, with limiting pin, a, extending therein, and fastened to plates, B, C, each of said disks having a slot, c, extending radially from its outer edge, as and for the purpose intended, substantially as described.

2. A valve system for transit tubes, consisting of a series of overlying rotatable tooth geared disks, pivoted to inner and outer plates, B, C, of an incasement, each of said disks having curved groove, b, into which is seated one end of a limiting pin, a, extending therein from plates of the incasement, the pivots on which the disks rotate being in a longitudinal right line on each plate, at equal distances apart, but so located that said pivots of each plate when the device is adjusted will be respectively intermediate each of the disks provided with slot, c, extending radially from periphery thereof, in combination with a metal strip lengthwise of the route intermediate of superimposed sections of said disks, whereby as motion is imparted to the device the disks will in succession be rotated the segment of a circle and open and close slot D, of tube, A, substantially as described.

3. The combination with longitudinally slotted transit tube, A, of a series of overlying tooth geared disks pivoted on opposite plates of an incasement, a section of each of said disks reaching over the slot of the tube, and having an inwardly extending slot, c, into which the arm, G, of the plunger, extending through the tube will intermesh, as said arm comes in contact therewith when motion is imparted thereto and in succession rotate each disk the segment of a circle, thereby opening the tube slot for passage of said arm or similar projecting device, and in like manner as progression is made of said operating member of the device impart reverse rotation of the several disks through the peripheral tooth gear thereof, substantially as described.

In testimony that I claim the invention above set forth I affix my signature in presence of two witnesses.

CHARLES W. S. TURNER.

Witnesses:
SAML. H. JACOBSON,
ANSON S. TAYLOR.